(12) United States Patent
Sudar

(10) Patent No.: US 9,631,748 B2
(45) Date of Patent: Apr. 25, 2017

(54) CLAMPING BELT AND PIPE COUPLING FOR THE FORCE-CLOSED CONNECTION OF PIPES, IN PARTICULAR OF SMOOTH-END PIPES

(71) Applicant: STRAUB WERKE AG, Wangs (CH)

(72) Inventor: Damir Sudar, Bad Ragaz (CH)

(73) Assignee: STRAUB WERKE AG, Wangs (CH)

( * ) Notice: Subject to any disclaimer, the term of this patent is extended or adjusted under 35 U.S.C. 154(b) by 164 days.

(21) Appl. No.: 14/370,784

(22) PCT Filed: Nov. 5, 2012

(86) PCT No.: PCT/IB2012/056162
§ 371 (c)(1),
(2) Date: Oct. 17, 2014

(87) PCT Pub. No.: WO2013/156830
PCT Pub. Date: Oct. 24, 2013

(65) Prior Publication Data
US 2015/0035275 A1 Feb. 5, 2015

(30) Foreign Application Priority Data
Apr. 20, 2012 (EP) .................................. 12164890

(51) Int. Cl.
*F16L 17/04* (2006.01)
*F16L 21/06* (2006.01)
(Continued)

(52) U.S. Cl.
CPC ............. *F16L 21/065* (2013.01); *F16L 17/04* (2013.01); *F16L 21/002* (2013.01);
(Continued)

(58) Field of Classification Search
CPC ....... F16L 21/065; F16L 21/002; F16L 21/005; F16L 33/04; F16L 17/04; F16B 2/08
See application file for complete search history.

(56) References Cited

U.S. PATENT DOCUMENTS

| 1,070,952 A | 8/1913 | Erickson | |
|---|---|---|---|
| 1,252,323 A * | 1/1918 | Cooper | ................. F16L 33/04 16/DIG. 25 |

(Continued)

FOREIGN PATENT DOCUMENTS

| DE | 314675 C | 10/1919 |
|---|---|---|
| DE | 954384 C | 12/1956 |

(Continued)

OTHER PUBLICATIONS

International Search Report's Written Opinion of the ISA, dated Dec. 19, 2012 from parent International Application PCT/IB2012/056162 published WO2013/156830A1 on Oct. 24, 2013, in full English translation.

(Continued)

*Primary Examiner* — David E Sosnowski
*Assistant Examiner* — James A Linford

(57) ABSTRACT

A clamping belt for a pipe coupling for connecting smooth-end pipes in a force-closed manner has ends that overlap each other, where the width of the two ends of the clamping belt that overlap each other together is no more than the width of the clamping belt in the longitudinal section between the ends. A pipe coupling using the clamping belt has a sealing element and an anchoring element that surrounds the sealing element. The anchoring element includes elements that follow one another in the circumferential direction.

19 Claims, 8 Drawing Sheets

(51) Int. Cl.
*F16L 21/00* (2006.01)
*F16L 21/08* (2006.01)
*F16L 25/14* (2006.01)
*F16L 33/04* (2006.01)
*F16B 2/08* (2006.01)

(52) U.S. Cl.
CPC .............. *F16L 21/005* (2013.01); *F16L 21/08* (2013.01); *F16L 25/14* (2013.01); *F16L 33/04* (2013.01); *F16B 2/08* (2013.01)

(56) References Cited

U.S. PATENT DOCUMENTS

| | | | |
|---|---|---|---|
| 1,272,541 A | 7/1918 | Scott | |
| 1,275,091 A | 8/1918 | Richardson | |
| 1,468,297 A | 9/1923 | Hogg et al. | |
| 1,476,024 A | 12/1923 | Thompson | |
| 1,999,683 A | 4/1935 | Borresen | |
| 2,270,375 A * | 1/1942 | King .................... | F16L 33/04 24/279 |
| 2,349,809 A | 5/1944 | Black | |
| 2,561,635 A | 7/1951 | Prochaska | |
| 3,722,041 A | 3/1973 | Munse | |
| 3,916,489 A | 11/1975 | Berger | |
| 4,083,588 A | 4/1978 | Berger | |
| 4,616,858 A | 10/1986 | Sauer | |
| 4,627,645 A | 12/1986 | Sauer | |
| 4,958,419 A | 9/1990 | Heckethorn et al. | |
| 5,157,816 A | 10/1992 | Huessler | |
| 6,913,292 B2 | 7/2005 | Snyder et al. | |
| 7,717,479 B2 | 5/2010 | Lebo et al. | |
| 7,866,707 B2 | 1/2011 | Sudar | |
| 8,292,331 B2 | 10/2012 | Sudar | |
| 2008/0184536 A1 | 8/2008 | Rigollet et al. | |

FOREIGN PATENT DOCUMENTS

| | | | | |
|---|---|---|---|---|
| DE | 3245092 A1 | 6/1984 | | |
| DE | 3428674 A1 | 2/1986 | | |
| DE | 3729372 A1 | 3/1989 | | |
| DE | 102005031209 A1 * | 1/2007 | ............. | F16B 2/065 |
| DE | 202006020776 U1 | 2/2010 | | |
| EP | 0157517 A1 | 10/1985 | | |
| EP | 0303902 A2 | 2/1989 | | |
| FR | 599968 A | 1/1926 | | |
| FR | 1140775 A | 8/1957 | | |
| FR | 1532461 A | 7/1968 | | |
| GB | 136273 A | 12/1919 | | |
| GB | 229073 A | 2/1925 | | |
| GB | 516550 A | 1/1940 | | |
| GB | 548845 A | 10/1942 | | |
| GB | 578037 A | 6/1946 | | |
| GB | 2144795 A | 3/1985 | | |
| GB | 2303677 A | 2/1997 | | |
| IL | EP 1832793 A2 * | 9/2007 | ............. | F16L 17/04 |
| JP | 60-201187 A | 10/1985 | | |
| JP | 2001-304474 A | 10/2001 | | |
| JP | 2008545921 A | 12/2008 | | |
| JP | 2011513663 A | 4/2011 | | |
| KR | 2001-0029396 A | 4/2001 | | |
| WO | 2006/100628 A1 | 9/2006 | | |
| WO | 2008/004173 A1 | 1/2008 | | |
| WO | 2009/107061 A1 | 9/2009 | | |

OTHER PUBLICATIONS

International Search Report and Written Opinion of the ISA, dated Dec. 19, 2012 from parent International Application PCT/IB2012/056162 published WO2013/156830A1 on Oct. 24, 2013; with partial translation.

European Search Report and EPO preliminary report on patentability dated Aug. 31, 2012 from priority EPO application EP12164890 filed Apr. 20, 2012.

Brochure "Straub-Eco-Grip," published by Straub Werke AG, Wangs Switzerland; discussed on p. 1 of Applicant's Specification.

* cited by examiner

CLAMPING BELT AND PIPE COUPLING FOR THE FORCE-CLOSED CONNECTION OF PIPES, IN PARTICULAR OF SMOOTH-END PIPES

This application is a 35 U.S.C. 371 national-phase entry of PCT International application no. PCT/IB2012/056162 filed on Nov. 5, 2012 and also claims benefit of priority to prior European (EPO) application no. EP12164890 filed on Apr. 20, 2012, and parent PCT International application no. PCT/IB2012/056162 is expressly incorporated herein by reference, in its entirety and as to all its parts, for all intents and purposes, as if identically set forth in full herein.

The invention relates to clamping belts for pipe couplings for the friction-locked connection of pipes, in particular of smooth-end pipes, as well as to pipe couplings for the friction-locked connection of pipes, in particular of smooth-end pipes.

Such pipe couplings, as marketed for example under the brand-name STRAUB-ECO-GRIP® by Straub AG, are mounted over the abutment point between two pipes and assume the holding function and the sealing function in the connection region of the pipes. For this purpose, at least one sealing element of a rubber-elastic material is provided, which is accommodated in a housing enclosing this or each sealing element. The housing including a sequence of elements following one another in the circumferential direction takes over the transfer of the forces acting on the pipes as a result of internal pressure or from the exterior.

WO2006/100628A1 discloses an anchoring element for a pipe coupling, the elements whereof are constituted by a first leg running essentially in the axial direction of the pipes and at least a second leg extending at an acute angle to the first leg. The spacing between the elements is preferably bridged by at least one deformable web. A seal for the transition between the pipes to be connected is held inside the anchoring element, at the outer side of which a further housing enclosing the anchoring element and the seal can be provided.

The friction-locked (or force-fitted) connection of the pipes is brought about by a force which is applied by at least one clamping belt surrounding the anchoring element in the circumferential direction. The ends of this clamping belt are braced with the aid of at least one essentially tangential clamping screw, that engages with bolts at the ends of the clamping belt, these bolts being disposed essentially in the axial direction of the pipes, and pulls the ends of the clamping belt towards one another.

As result of the spacing between the ends of the clamping belt, there is an interruption in the uniform force transfer in the region of the adjacent clamping belt. This interruption is possibly bridged inadequately by an additional component. As a result of the radial spacing of the application points of the clamping force of the clamping screw on the bolt of the clamping belt, with respect to the outer pipe circumference, flexural loading of the clamping screw and, thus, tensions in the clamping screw closure occur.

In the area of hose clips, GB229073A discloses an embodiment according to which one of the ends of the actual clamping strap is guided, in the coupled state, through an opening in the opposite end that is wider compared to the remaining length of the clamping strap. Both ends are constituted looped and receive bolts, between which a clamping screw is clamped. For the tensioning of the hose clip, the bolts and therefore the ends of the clamping strap are pushed apart by means of the clamping screw. As also described in FR599968A, uniform pressing along the entire circumference of the hose or pipe can be achieved with such hose clips.

However, in order to be able to cover different diameters of hoses, the length of the clamping strap can be changed by a gradual change in the position of the looped ends. In order that the clamping screw can be used in any length of the clamping strap, individual discrete holes are provided in the clamping strap for the passage of the clamping screw in GB229073A. At least one position of the clamping strap always lies, however, between the clamping screw and the seal and/or the hose or pipe, so that the clamping screw always lies to a considerable extent outside the outer pipe circumference and consequently considerable flexural loading of the clamping screw and tensions in the clamping screw closure also arise here due to this radial spacing of the points of application of the clamping force.

A solution of the present invention, therefore, is to propose a pipe coupling, wherein the aforementioned drawbacks are avoided. In particular, loading of the pipes that is as uniform as possible around the circumference should be ensured with the least possible loading of the clamping mechanisms and of their points of application.

Advantageous developments are presented in the figures and in the disclosure.

According to the present disclosure, provision is made such that the maximum bounds of lateral extent of the widths of the two mutually overlapping ends of the clamping belt together corresponds at most to the width of the clamping belt in the longitudinal portion, and at least one longitudinal slot extending in the longitudinal direction of the clamping belt is also provided in the end of the clamping belt that is passed through the longitudinal slot of the other end. The term "clamping belt" includes in particular clamping straps or all clamping elements that are essentially flat or strap-shaped between their ends.

Apart from carrying away the clamping forces in a direction tangential to the pipe cross-section and the uniform loading on the pipe over the entire circumference without interruption, the arrangement of the clamping mechanism, however constituted, very close to the outer pipe circumference is also possible. Tensions in the clamping mechanism, for example in an arrangement with bolts at the ends of the clamping belt, which bolts can be pushed apart by one or more clamping screws, are thus also avoided, as is flexural loading of the clamping screws themselves.

The net extant clamping belt material width of each of the two ends preferably corresponds essentially to half the local engaging width of the clamping belt. The ends themselves can advantageously be constituted as closed loops.

The creation of the loops is very simple if, according to an advantageous embodiment of the clamping belt, the latter is constituted double-layered continuously over its entire length. For this purpose, it can preferably comprise a one-piece, closed strap with a fixed preselected length.

According to the present disclosure, the aforementioned problem is also solved by a pipe coupling of the type mentioned at the outset, the clamping belt of which is constituted according to one of the above features. Any kind of clamping mechanism, preferably a standard clamping mechanism with bolts at the ends of the clamping belt, the spacing of which is variable by at least one essentially tangential clamping screw, may thus be disposed, in the radial sense, particularly close to the pipe circumference.

In particular, according to a further advantageous feature within the scope of the present disclosure, the at least one clamping screw may be passed through a longitudinal slot in each of the ends of the clamping belt. The clamping screw may thus be passed tangentially and particularly close to the pipe circumference, so that, even in the case of great clamping forces, only minimal flexural loading and also only very small tensions occur in any kind of clamping mechanism.

An advantageous version with a clamping mechanism making use of at least one clamping screw for the solution to the problem is characterised in that each clamping screw is screwed with its threaded portion into a threaded hole of one of the bolts and is accommodated with its threaded-side end in the other bolt in a recess, in particular a blind hole, the inner diameter of which becomes greater towards the exterior at least in the direction of the axis of the bolt. This feature ensures the reduction of stresses in the clamping screw closure and permits a geometrical compensation in the case of a change in the axes of the bolts at the ends of the clamping belt in the plane containing the bolts and the clamping screw, such as occurs for example when pipes of differing diameter are connected.

In order fully to enable the geometrical compensation and to further reduce or completely prevent tensions in the clamping screw closure, the recess, in particular the blind hole, has a larger diameter than the threaded-side end of the clamping screw in every radial direction of the clamping screw, and preferably widens outwards cone-shaped.

Provision is preferably made such that the clamping screw is provided with a spherically rounded screw end.

The advantages according to the present disclosure can also be obtained with a variant of the pipe coupling, wherein a bridge is provided for bridging the spacing in the region of overlapping of ends between the ends of the clamping belt, said bridge being provided with a recess for the clamping screw. This bridge is preferably connected to one of the ends of the clamping belt. As a result of this feature, the clamping screw axis comes to lie as close as possible to the apex of the pipe during the bracing of the pipe coupling, wherein approximately half the shaft external diameter of the clamping screw is obtained as the smallest spacing. The force vectors of the clamping forces of the clamping belts thus come as closely as possible into agreement with the connecting line of the force vectors of the clamping forces, so that flexural loading of the clamping screw and tensions in its closure parts may be reduced or completely prevented.

According to the prior art, pipe couplings are known, in which at least one sealing element made of rubber-elastic material is disposed inside a housing. If need be, discs lying at the side of the sealing element and/or at least one anchoring element surrounding at least one sealing element can also be provided. As is disclosed for example in WO 2006/100628 A1, such an anchoring element can include a sequence of elements following one another in the circumferential direction, which elements in turn include a first leg running essentially in the axial direction of the pipes and at least a second leg extending at an acute angle to the first leg.

In order to obtain, here too, the aforementioned advantages of the tangential clamping mechanism with clamping forces running as close as possible to the pipe circumference, a recess is provided in the anchoring element in each case in the regions of the clamping screws, and at least a longitudinal portion of each clamping screw comes to lie in each case at least partially, preferably essentially up to half its diameter, in a recess.

A preferred version within the scope of the present disclosure is characterised in that the recess is fashioned, preferably stamped, in at least one of the first legs of the anchoring element.

Provision is also preferably made such that a recess corresponding to the recess in the first leg of the anchoring element and/or in the bridge is fashioned in at least one sealing element, in the region whereof one of the clamping screws runs in each case.

At least two clamping screws may advantageously be provided, preferably symmetrical to the longitudinal central plane of the clamping belt.

The application of a force effectively identical over the entire circumference of the pipe or each pipe and uniformly loading the clamping belt also over its entire length can be obtained by a further version of a pipe coupling according to the present disclosure, wherein both bolts are lengthened beyond the width of the clamping belt and at least one clamping screw is provided in each case in the lengthened ends of the bolts on each side of the clamping belt.

Further advantages, features and details of the invention emerge from the following description, in which examples of versions are described in reference to the drawings. The features may be essential to the invention individually in themselves, or in any combination.

The list of reference numbers is a component part of the disclosure. The figures are described in interrelated and comprehensive manner. Identical reference numbers signify identical components, reference numbers with different indices indicating functionally identical or similar components.

Figure 1:
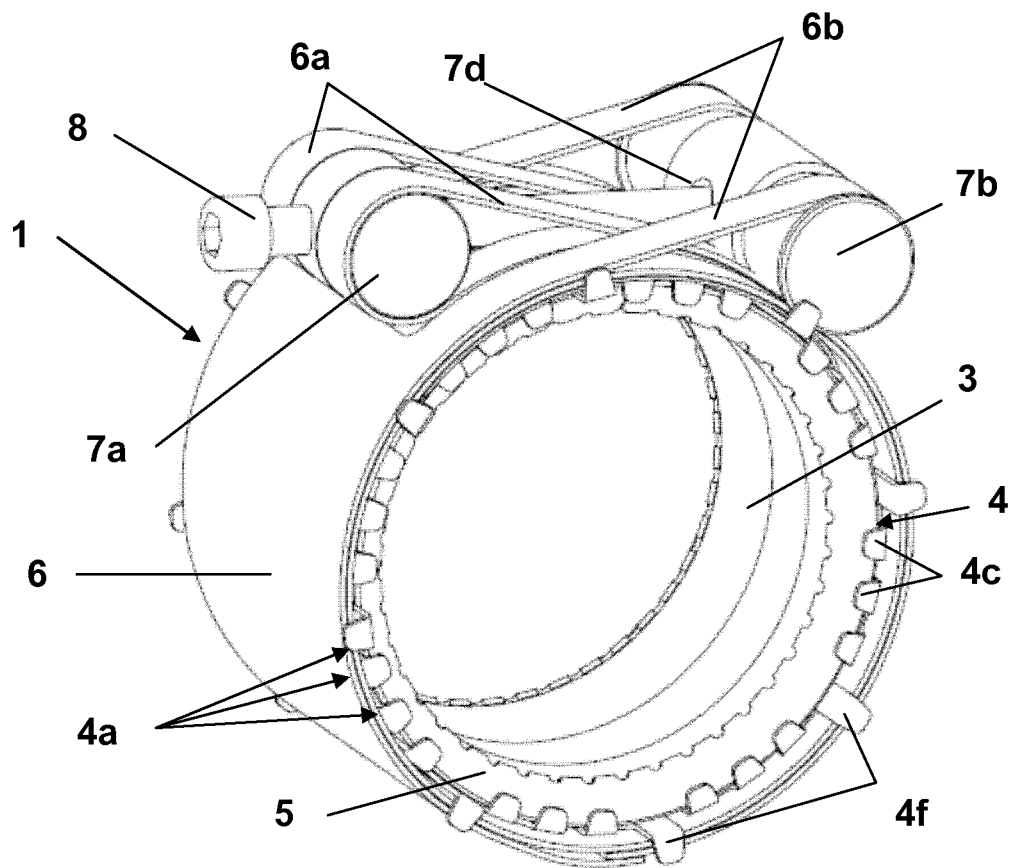
FIG. 1 depicts a first version of a complete pipe coupling in a perspective representation.

FIG. 1 shows a pipe coupling 1 in the state as it is constituted for the connection of two pipes 2 (see FIG. 2) and mounted on the abutment region between the ends of the two pipes 2. At least one sealing element 3 made of rubber-elastic material is provided as the innermost component. This (or each) sealing element 3 is preferably surrounded and held by an anchoring element 4 that includes many individual elements 4a next to one another in the circumferential direction and takes over the transfer of the forces acting as a result of internal pressure or from the exterior on pipes 2. At least one plate 5 lies adjacent to the end faces of the, or each, sealing element 3 and inside the end face of anchoring element 4, and runs around respective pipe 2 in order to prevent sealing element 3 from being pushed out when force is applied to it. If need be, a housing could also surround anchoring element 4 and plates 5.

At least one clamping belt 6 lies adjacent to the outer side of anchoring element 4 over essentially the entire circumference. If need be, clamping belt 6 could also lie directly on seal 3 or be provided at its inner side with a sealing layer. Ends 6a, 6b of clamping belt 6 are provided with bolts 7a, 7b orientated in the axial direction of pipe coupling 1 and therefore also of pipes 2 to be connected, between which bolts 7a, 7b at least one clamping screw 8 is clamped. Clamping screw 8 is rotated for the tensioning of clamping belt 6 in such a way that a force pointing away from the region of the overlapping of ends 6a, 6b of clamping belt 6 is produced, so that bolts 7a, 7b move away from one another. Bolts 7a, 7b are pushed into more remote positions from one another pointing away from the region of the overlapping of ends 6a, 6b of clamping belt 6. The clamping forces are thus carried away in a direction tangential to the pipe cross-section and, at the same time, a uniform force and loading over the entire circumference without interruption is produced on sealing element 3, if applicable, anchoring element 4, and finally also pipe 2, by clamping belt 6 lying essentially completely adjacent on sealing element 3 or anchoring element 4. Other clamping mechanisms are of course also conceivable, which manage without or with differently disposed clamping screws 8.

In order to facilitate the passage of bolt 7a at first end 6a running centrally out of clamping belt 6 through opposite end 6b of clamping belt 6, the length of this bolt 7a preferably corresponds to the bounds of lateral extent of smaller-width end 6a of clamping belt 6. End 6b runs away from the edges of clamping belt 6 and engages around opposite end 6a of clamping belt 6, wherein the length of bolt 7b preferably corresponds to the maximum bounds of lateral extent of the entire width of clamping belt 6.

Figure 2:
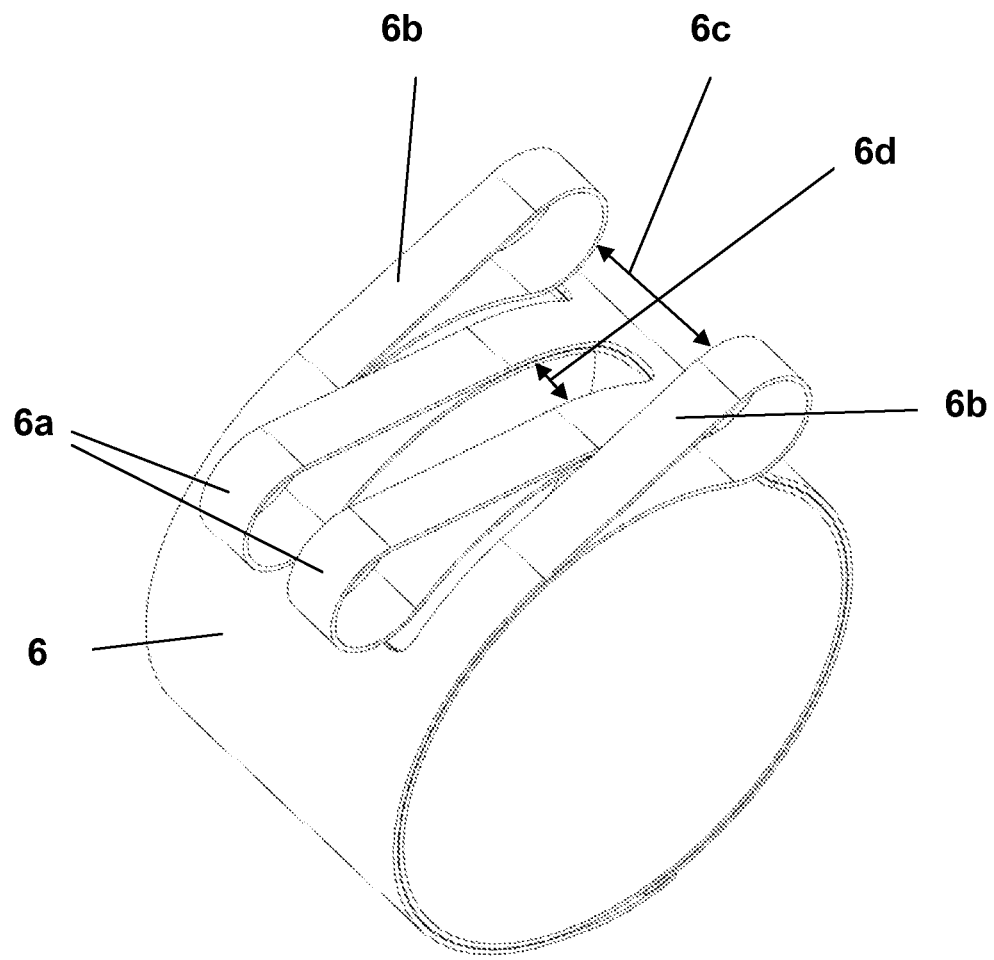
FIG. 2 depicts a perspective representation of a clamping belt alone, but in a position as in use in a pipe coupling.

FIG. 2 represents the clamping belt alone, but in the position of use as in the pipe coupling of FIG. 1. Clamping belt 6 is preferably constituted double-layered continuously over its entire length and its ends 6a, 6b are particularly advantageously constituted as closed loops, into which bolts 7a, 7b are pushed and preferably fixed therein. A version in which clamping belt 6 comprises a one-piece, closed strap with a fixed preselected length is particularly advantageous and suitable for the transfer of large forces.

As can clearly be seen in FIGS. 1-2, loop-shaped ends 6a, 6b of clamping belt 6 engage in one another in such a way that one of the ends—here end 6a—of clamping belt 6 is passed through at least one longitudinal slot 6c of the other end—here end 6b—running in the peripheral direction. The two ends 6a, 6b overlap one another, wherein the maximum bounds of lateral extent of width of the two mutually overlapping ends 6a, 6b of clamping belt 6 together preferably corresponds essentially to the width of clamping belt 6 in its longitudinal portion—which follows the pipe circumference—between ends 6a, 6b. Each of ends 6a, 6b preferably forms essentially half the total extant clamping belt material surface width of engagement of clamping belt 6 in the overlapping region.

As emerges particularly clearly from FIG. 2, a further longitudinal slot 6d extending in the circumferential direction of clamping belt 6 is also provided in end 6a of clamping belt 6 that is passed through longitudinal slot 6c in the other end 6b. It is thus possible to guide clamping screw 8 in the region of longitudinal slot 6d and to bring it as close as possible tangentially to the outer side of the pipe, since only sealing element 3, at most anchoring element 4 and/or a housing, but not material of clamping belt 6, is located between clamping screw 8 and pipe 2. Only the width of the diameter of the (or each) clamping screw 8 running between bolts 7a, 7b is thus lacking in the region of overlapping of ends 6a, 6b compared to the width of remaining clamping belt 6.

Clamping screw 8 sitting in the longitudinal center of bolts 7a, 7b in FIG. 1 is screwed with its threaded portion 8a into the threaded hole 7c of one of bolts 7a. Threaded-side end 8b of clamping screw 8 is connected to the other bolt 7b, for example accommodated in a recess of this bolt 7b, in particular a blind hole 7d. Clamping screw 8 is rotated for the tensioning of clamping belt 6 in such a way that a force pointing away from the region of the overlapping of ends 6a, 6b of clamping belt 6 is produced, so that bolts 7a, 7b move away from one another. Bolts 7a, 7b are thus displaced into more remote positions from one another pointing away from the region of the overlapping of ends 6a, 6b. The clamping forces are thus carried away in a direction tangential to the pipe cross-section and, at the same time, a uniform force and loading over the entire circumference without interruption is produced on housing 4, sealing element 3, and finally also pipe 2 by clamping belt 6 lying essentially completely adjacent to housing 4. The, or each, clamping screw 8 is orientated essentially tangential to pipe coupling 1 and pipes 2 to be connected.

Figure 3:
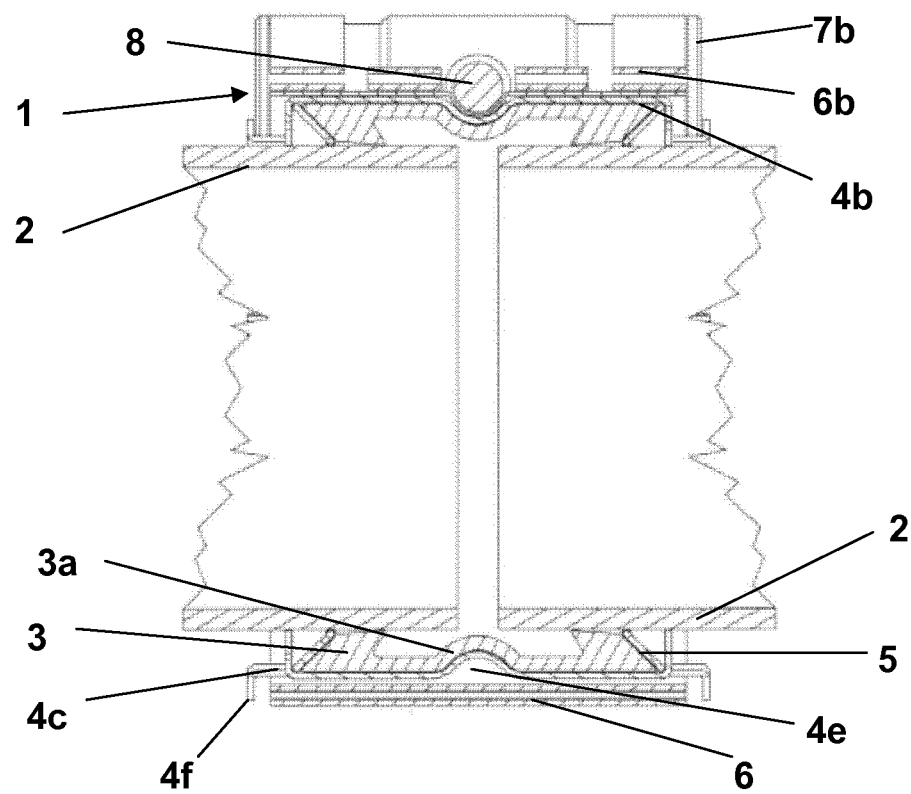
FIG. 3 depicts a cross-section through the pipe coupling of FIG. 1 normal to the clamping screw with the connection of two pipes.

The cross-sectional view of FIG. 3 depicts that elements 4a of anchoring element 4 are constituted in each case by a first leg 4b running essentially in the axial direction of pipe 2, and at least a second leg 4c extending at an acute angle to first leg 4b. The spacing between elements 4a is bridged by at least one elastically or plastically deformable web 4d (see in this regard FIG. 6), which runs between first legs 4b. Webs 4d are disposed alternately in front of and behind the longitudinal center of first leg 4b. In order to enable the position of clamping screw 8 as close as possible to the apex of pipe 2, so as to avoid the flexural loading of clamping screw 8, a recess 4e is preferably fashioned in first leg 4b, which recess can preferably be put in place by stamping. A recess 3a is also preferably provided in sealing element 3 to accommodate recess 4e of anchoring element 4. The central longitudinal portion of clamping screw 8 comes to lie at least partially, preferably essentially up to half its diameter, in this recess 4e of anchoring element 4.

Figure 4:
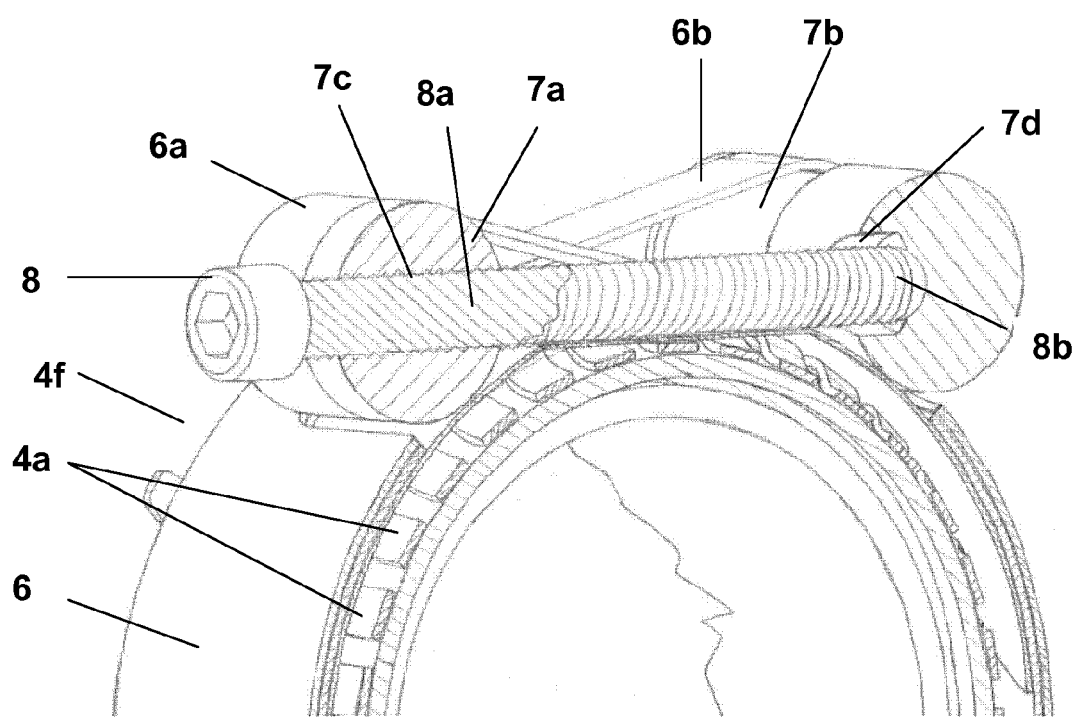
FIG. 4 depicts a cross-section through the pipe coupling of FIG. 1 in the plane of the clamping screw.

FIG. 4 represents in magnified view the bearing of clamping screw 8 in bolts 7a, 7b. Clamping screw 8 is screwed with its threaded portion 8a into a bolt 7a and, as a result of its threaded-side end 8b lying adjacent to bolt 7b, exerts a force which acts on the two bolts 7a, 7b pushing them away from one another. For this purpose, threaded-side end 8b is accommodated in a blind hole 7d in bolt 7b, which blind hole 7d has a larger diameter, preferably at least in the direction of the axis of bolt 7b, than threaded-side end 8b of clamping screw 8. For a reduction of stresses in the clamping screw closure acting in all directions, and for an all-round geometrical compensation when the axes of bolts 7a, 7b changes relative to one another, blind hole 7d preferably includes, over the entire circumference of clamping screw 8, a larger diameter than threaded-side end 8b of clamping screw 8. Deviations of the axes of bolts 7a, 7b from the parallel position—as in the case of pipes 2 of identical diameter—are thus possible in every direction without tensions or flexural loading of clamping screw 8, such as occurs for example with the connection of pipes 2 having different diameters (see for example in FIG. 6). Threaded-side end 8b of clamping screw 8 is preferably provided with a spherically rounded screw end.

Figure 5:
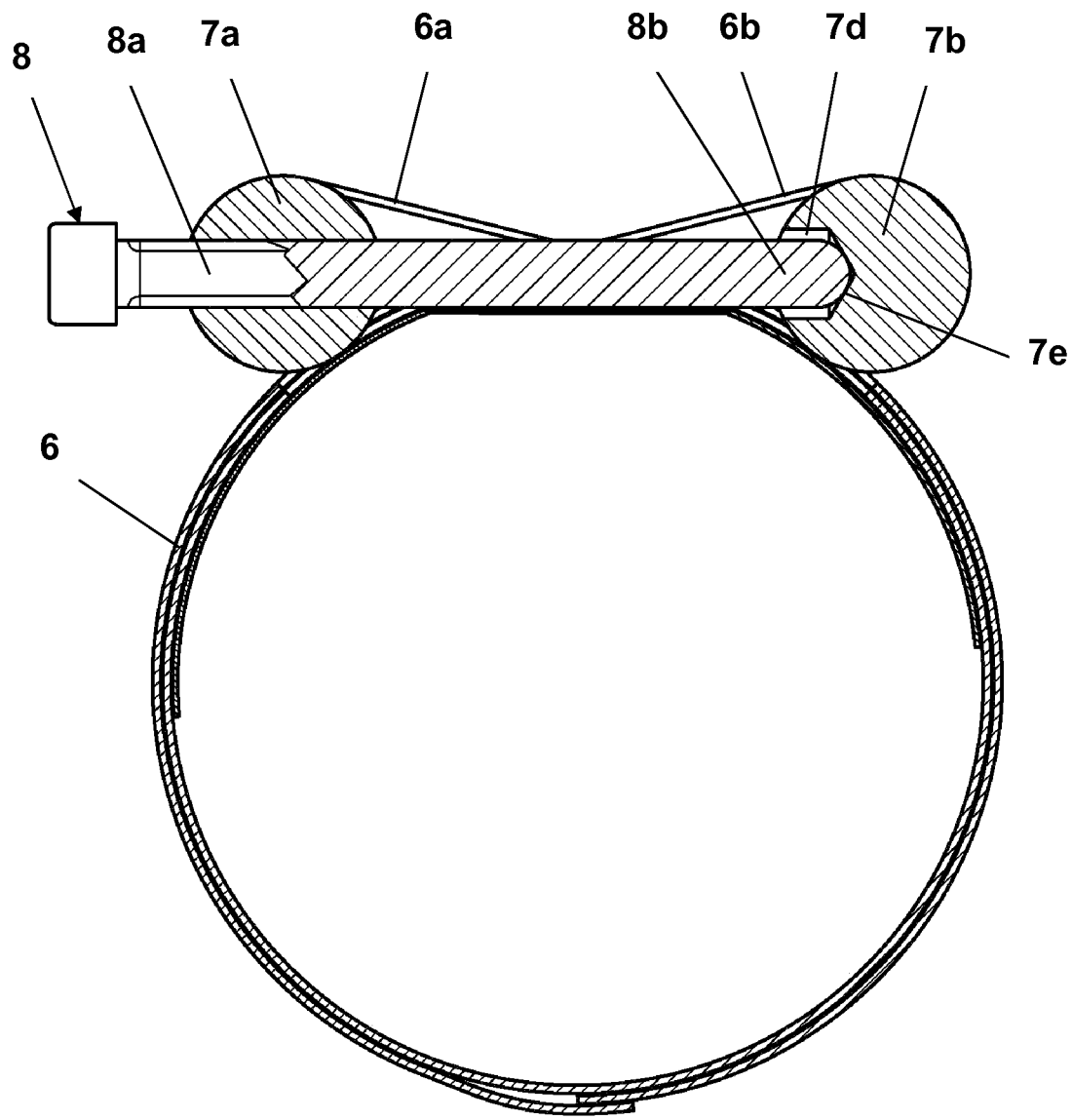
FIG. 5 depicts a cross-section through a pipe coupling according to the invention along a clamping screw.

A further advantageous version of the clamping mechanism emerges from the cross-sectional representation of FIG. 5. Blind hole 7d in bolt 7b is provided with an outwardly conically widening portion 7e, preferably in the bottom of blind hole 7d.

Figure 6:
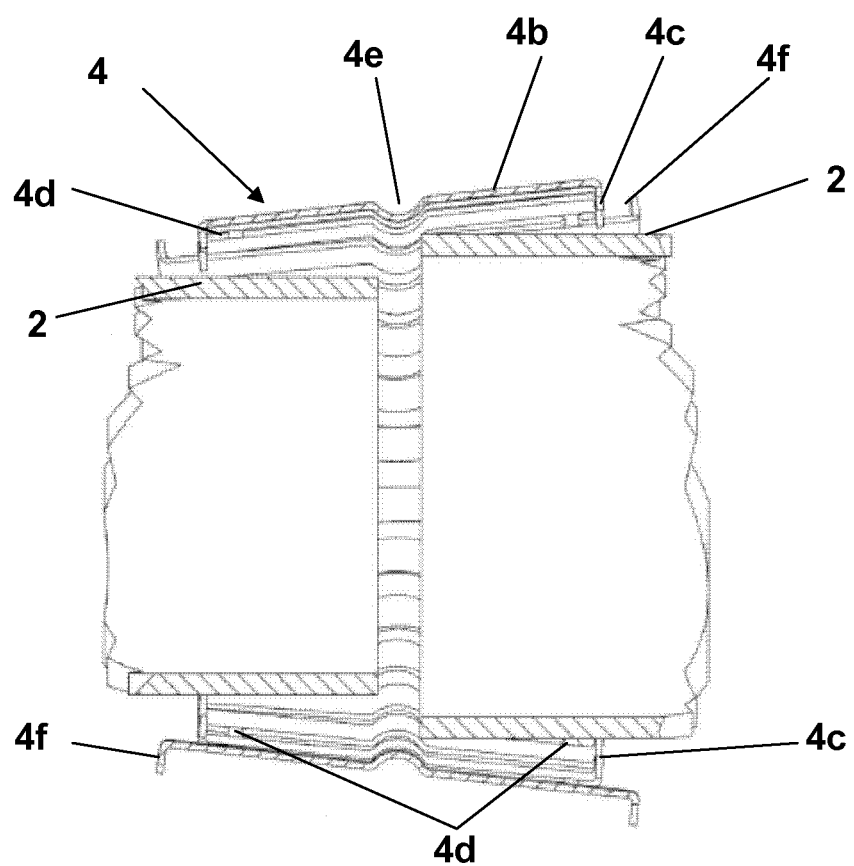
FIG. 6 depicts a longitudinal cross-section through the connection region of two pipes of differing diameter with a representation of the correspondingly deformed housing.

FIG. 6 represents the situation for the case of a connection of pipes 2 having a different diameter, wherein however only pipes 2 and anchoring element 4 are depicted. In the complete pipe coupling, clamping belt 6 and, if applicable, also a housing between this clamping belt 6 and anchoring element 4, lies over anchoring element 4. The preferred version of anchoring element 4 can, however, be seen clearly in a manner such that a third leg 4f of some elements 4a of anchoring element 4 is orientated away from the pipe axis. As a result of this version, overlying clamping belt 6 (not represented) is secured against slipping off solely by outwardly orientated third leg 4f of anchoring element 4, without the use of further fixing or holding components, even with the clearly visible conical deformation of anchoring element 4.

Figure 7:
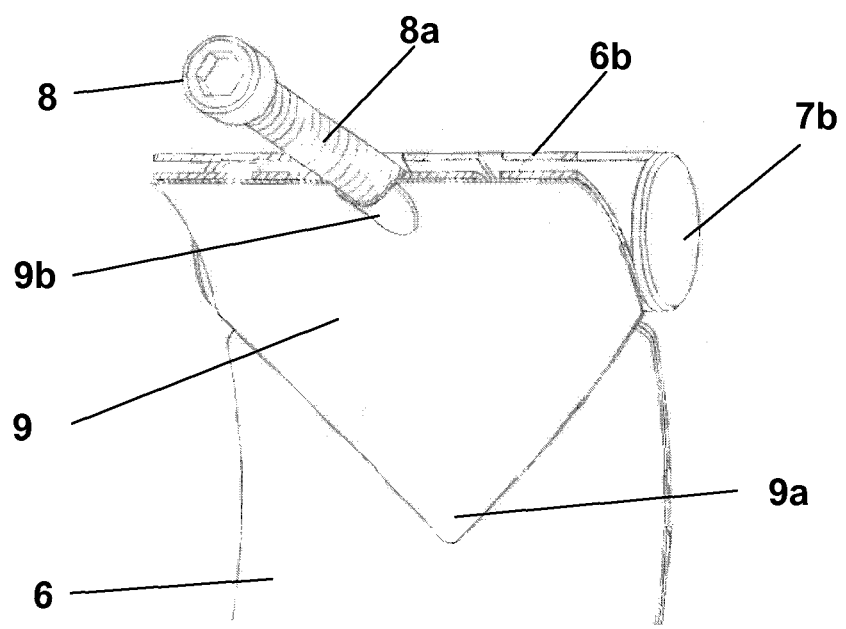
FIG. 7 depicts a variant with a bridge for bridging the spacing in the region of overlapping of ends between the ends of the clamping belt; and, FIG. 8 depicts a further variant of a pipe coupling, with two lateral clamping screws.

FIG. 7 represents another version of pipe coupling 1, wherein a bridge 9 is provided, this bridging the spacing that is provided between ends 6a of clamping belt 6 that are raised by anchoring element 4, in order to create a pressure acting radially inwards also in this region, which is very narrow with clamping belt 6 according to the present disclosure. Ends 9a of the bridge are preferably cut arrow-shaped in order to prevent wedging between elements 4a of anchoring element 4 in the sliding—over during the tightening of clamping belt 6. A recess 9b is advantageously also fashioned in bridge 9, so that threaded portion 8a of clamping screw 8 can be accommodated therein and clamping screw 8 can thus be disposed as close as possible to the apex of pipes 2 to be connected.

Figure 8:
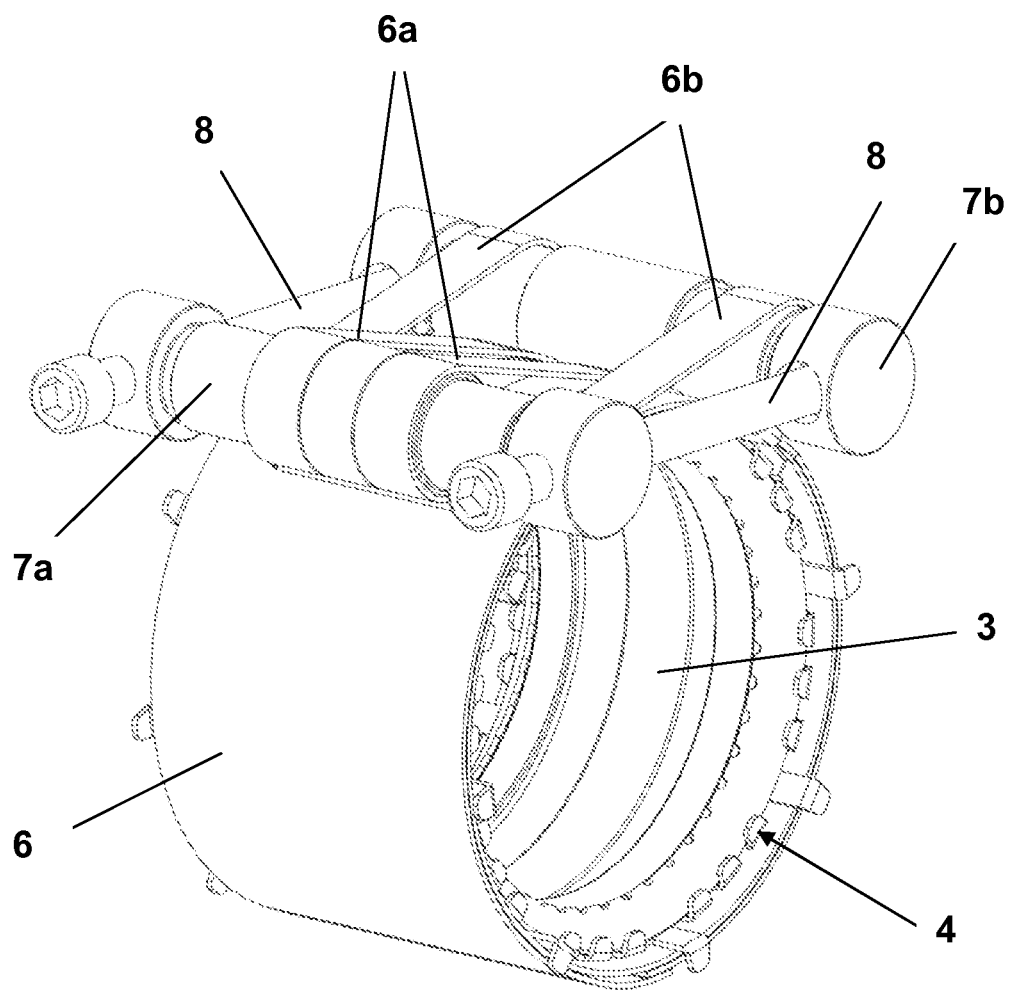

Instead of a central clamping screw 8, it is also possible, as represented in FIG. 8, to provide a clamping screw at each end of bolts 7a, 7b, wherein further clamping screws 8 could also be disposed along bolts 7a, 7b. For this purpose, both bolts 7a, 7b are advantageously lengthened beyond the width of clamping belt 6, so that clamping screws 8 come to lie outside the width of clamping belt 6. For this purpose, bolts 7a, 7b can, if appropriate, be constituted multi-part or telescopically extendable, in order to bring them to the actually desired length only after the cross-over of ends 6a, 6b of clamping belt 6.

LIST OF REFERENCE LABELS

1 Pipe coupling
2 Pipe
3 Sealing element
3a Sealing element recess
4 Anchoring element
4a Element of anchoring element
4b First leg
4c Second leg
4d Web
4e Housing recess
4f Third leg outwards
5 Plate
6 Clamping belt
6a,6b Clamping belt ends
6c Longitudinal slot in first clamping belt end
6d Longitudinal slot in second clamping belt end
7a,7b Bolts
7c Threaded hole
7d Blind hole
7e Conical bottom of blind hole
8 Clamping screw
8a Threaded portion
8b Threaded-side end
9 Bridge
9a Bridge end
9b Bridge recess

What is claimed is:

1. A pipe-coupling clamping belt comprising:
    an anchor element configured for circumferentially extending and surrounding respective pipe ends;
    a clamping belt band configured for circumferentially extending and surrounding the anchor element;
    a first end on said clamping belt band;
    a first bolt connected to said first end, said first bolt being disposed transversely relative to the circumferential direction;
    a first end region of said clamping belt band being located proximate to said first end;
    a second end on said clamping belt band;
    a second bolt connected to said second end, said second bolt being disposed transversely relative to the circumferential direction;
    a second end region of said clamping belt band being located proximate to said second end;
    said first end region having at least one longitudinal slot extending in the circumferential direction, said at least one longitudinal slot sized to receive said second end region passed through said at least one longitudinal slot to form a region of overlap for said first and second end regions of said clamping belt band;
    said first and second bolts being operatively interconnected to controllably displace said first and second ends away from said region of overlap for tightening;
    a lateral extent maximum bounds of said first and said second end regions together in said region of overlap having value less than or equal to a width of said clamping belt band lying outside said region of overlap and between said first and second ends;
    a second longitudinal slot in said second end region and extending in the circumferential direction;
    said first and second bolts being operatively interconnected via a clamping screw extending tangentially to the circumferentially extending anchor element and clamping belt band, and at least partially through the second longitudinal slot, where the clamping screw controllably displaces said first and second ends away from said region of overlap for tightening said clamping belt band;
    wherein the anchor element includes a recess extending circumferentially at least partially there-around, the recess being located proximate to said region of overlap such that the recess accommodates at least a portion of said clamping screw.

2. The pipe-coupling clamping belt as claimed in claim 1 wherein: each of said respective first and second ends having corresponding respective widths of less than or equal to half of the width of said clamping belt band.

3. A pipe-coupling clamping belt as claimed in claim 1 further comprising: respective closed loops at each of said respective first and second ends.

4. The pipe-coupling clamping belt as claimed in claim 1 wherein: said clamping belt band is double-layered continuously over its length.

5. A pipe-coupling clamping belt as claimed in claim 1 further comprising: a one-piece closed strap having a fixed preselected length, and said belt band includes said one-piece closed strap.

6. A pipe coupling for pipes, comprising:
    at least one seal configured for circumferentially extending and surrounding respective pipe ends;
    an anchor element configured for circumferentially extending and surrounding the at least one seal;
    at least one clamping belt configured for circumferentially extending and surrounding the anchor element;

said clamping belt including a clamping belt band configured for assembly circumferentially over said at least one seal;
a first end on said clamping belt band;
a first bolt connected to said first end, said first bolt being disposed transversely relative to the circumferential direction;
a first end region of said clamping belt band being located proximate to said first end;
a second end on said clamping belt band;
a second bolt connected to said second end, said second bolt being disposed transversely relative to the circumferential direction;
a second end region of said clamping belt band being located proximate to said second end;
said first end region having at least one longitudinal slot extending in the circumferential direction, said at least one longitudinal slot sized to receive said second end region passed through said at least one longitudinal slot to form a region of overlap for said first and second end regions of said clamping belt band;
said first and second bolts being operatively interconnected via a clamping screw controllably displacing said first and second ends away from said region of overlap for tightening said clamping belt;
a lateral extent maximum bounds of said first and said second end regions together in said region of overlap having value less than or equal to a width of said clamping belt band lying outside said region of overlap and between said first and second ends; and,
a second longitudinal slot in said second end region and extending in the circumferential direction,
wherein the anchor element includes a recess extending circumferentially at least partially there-around, the recess being located proximate to said region of overlap such that the recess accommodates at least a portion of said clamping screw.

7. The pipe coupling for pipes as claimed in claim 6 wherein: said clamping screw passes through said second longitudinal slot.

8. A pipe coupling for pipes as claimed in claim 6 further comprising:
a threaded-side end on said clamping screw;
said threaded-side end of said clamping screw being accommodated in a blind-hole recess located in one of said first and second bolts, said blind-hole recess having an opening, and an inner diameter of said blind-hole recess increasing in a direction from its interior towards said opening; and,
said clamping screw having a threaded portion, said threaded portion being screwed into a threaded hole in the other one of said first and second bolts.

9. The pipe coupling for pipes as claimed in claim 8 wherein: said blind-hole recess has larger diameter, relative to every radial direction of said clamping screw, than the diameter of said threaded-side end of said clamping screw, and said blind-hole recess includes cone-shaped widening oriented in a direction from its interior towards said opening.

10. The pipe coupling for pipes as claimed in claim 8 wherein: said threaded-side end is spherically rounded.

11. A pipe coupling for pipes as claimed in claim 6 further comprising: a spherically rounded end on said clamping screw.

12. A pipe coupling for pipes as claimed in claim 6 further comprising: a bridge portion situated to bridge, in said region of overlap, spacing between said first and second ends.

13. A pipe coupling for pipes as claimed in claim 12 further comprising: a recess in said bridge, said recess receiving said clamping screw.

14. The pipe coupling for pipes as claimed in claim 12 wherein: said bridge is connected to one of said first and second end regions.

15. A pipe coupling for pipes as claimed in claim 6 further comprising:
said seal anchor including a plurality of limb members sequentially disposed along the circumferential direction, each of said plurality of limb members including a respective first limb part, with respective spaces between respective adjacent ones of said plurality of limb members, and a plurality of said respective spaces being bridged each by at least one respective deformable web extending between the respective adjacent ones of said first limb parts bounding their respective space;
each of said plurality of limb members including at least one respective second limb part extending at a respective acute angle relative to its respective limb member's respective first limb part; and,
at least some of said plurality of limb members respectively each including a respective third limb part oriented radially outwards towards said clamping belt band.

16. The pipe coupling for pipes as claimed in claim 15 wherein: said recess is formed in at least one first limb part of said seal anchor.

17. A pipe coupling for pipes as claimed in claim 6 further comprising: said seal has a seal recess corresponding to said recess provided in said seal anchor.

18. A pipe coupling for pipes as claimed in claim 6 further comprising:
a second clamping screw operatively interconnecting said first and second bolts and situated to controllably displace said first and second ends away from said region of overlap for tightening said clamping belt; and,
said first clamping screw and said second clamping screw are disposed symmetrically relative to said clamping belt.

19. The pipe coupling for pipes as claimed in claim 18 wherein: said first and second bolts have respective lengths both longer than the width of said clamping belt band, and at least one of said first and second clamping screws is provided in the lengths of said first and second bolts lying beyond the width of said clamping belt band.

* * * * *